US011257298B2

(12) United States Patent
Kim et al.

(10) Patent No.: US 11,257,298 B2
(45) Date of Patent: Feb. 22, 2022

(54) RECONSTRUCTING THREE-DIMENSIONAL SCENES IN A TARGET COORDINATE SYSTEM FROM MULTIPLE VIEWS

(71) Applicant: Adobe Inc., San Jose, CA (US)

(72) Inventors: Vladimir Kim, Seattle, WA (US); Pierre-alain Langlois, Paris (FR); Oliver Wang, Seattle, WA (US); Matthew Fisher, San Francisco, CA (US); Bryan Russell, San Francisco, CA (US)

(73) Assignee: Adobe Inc., San Jose, CA (US)

(*) Notice: Subject to any disclaimer, the term of this patent is extended or adjusted under 35 U.S.C. 154(b) by 14 days.

(21) Appl. No.: 16/822,819

(22) Filed: Mar. 18, 2020

(65) Prior Publication Data
US 2021/0295606 A1    Sep. 23, 2021

(51) Int. Cl.
*G06T 19/20* (2011.01)
*G06T 9/00* (2006.01)
*G06T 17/20* (2006.01)
*G06T 17/00* (2006.01)

(52) U.S. Cl.
CPC ............... *G06T 19/20* (2013.01); *G06T 9/00* (2013.01); *G06T 9/002* (2013.01); *G06T 9/008* (2013.01); *G06T 17/00* (2013.01); *G06T 17/20* (2013.01); *G06T 2207/10028* (2013.01)

(58) Field of Classification Search
CPC ........... G06T 9/002; G06T 9/00; G06T 17/00; G06T 17/20
See application file for complete search history.

(56) References Cited

U.S. PATENT DOCUMENTS

2015/0381968 A1* 12/2015 Arora ..................... G06T 17/00
 348/47
2019/0108396 A1* 4/2019 Dal Mutto ........... G06K 9/6267

OTHER PUBLICATIONS

U.S. Appl. No. 16/816,080, Nov. 13, 2020, Notice of Allowance.
Kulkarni at al., Canonical Surface Mapping Via Geometric Cycle Consistency, in International Conference on Computer Vision (ICCV), Aug. 15, 2019, available at https://arxiv.org/pdf/1907.10043.pdf.
Lin et al., Photometric Mesh Optimization for Video-Aligned 3D Object Reconstruction, in Computer Vision and Pattern Recognition, Mar. 20, 2019, available at https://arxiv.org/pdf/1903.08642.pdf.

(Continued)

*Primary Examiner* — Matthew Salvucci
(74) *Attorney, Agent, or Firm* — Keller Jolley Preece

(57) ABSTRACT

Methods, systems, and non-transitory computer readable storage media are disclosed for reconstructing three-dimensional meshes from two-dimensional images of objects with automatic coordinate system alignment. For example, the disclosed system can generate feature vectors for a plurality of images having different views of an object. The disclosed system can process the feature vectors to generate coordinate-aligned feature vectors aligned with a coordinate system associated with an image. The disclosed system can generate a combined feature vector from the feature vectors aligned to the coordinate system. Additionally, the disclosed system can then generate a three-dimensional mesh representing the object from the combined feature vector.

20 Claims, 8 Drawing Sheets

(56) References Cited

OTHER PUBLICATIONS

Snavely, Photo Tourism: Exploring Photo Collections in 3D, ACM Transactions on Graphics, Jul. 2006, available at https://doi.org/10.1145/1141911.1141964.

Furukawa et al., Accurate, Dense, and Robust Multi-View Stereopsis, in Proceedings / CVPR, IEEE Computer Society Conference on Computer Vision and Pattern Recognition, IEEE, Jun. 2007, available at https://www.researchgate.net/publication/221364612_Accurate_Dense_and_Robust_Multi-View_Stereopsis.

Groueix et al., AtlasNet: A Papier-Mâché Approach to Learning 3D Surface Generation, in Computer Vision and Pattern Recognition, Jul. 20, 2018, available at https://arxiv.org/pdf/1802.05384.pdf.

Kanazawa et al., Learning Category-Specific Mesh Reconstruction from Image Collections, in The European Conference on Computer Vision (ECCV), 2018.

* cited by examiner

RECONSTRUCTING THREE-DIMENSIONAL SCENES IN A TARGET COORDINATE SYSTEM FROM MULTIPLE VIEWS

BACKGROUND

Improvements to digital image capturing and processing technologies have led to significant advancements in the field of digital object detection and reconstruction. For instance, some digital imaging systems utilize image processing techniques to enhance various computing environments including educational applications, medical applications, commercial applications, and entertainment applications. For example, digital imaging systems can process digital images or video of real-life objects to reconstruct the objects as digital three-dimensional geometry. Reconstructing real-life objects within digital environments allows users to view and/or interact with the reconstructed models via computing devices.

Accurately detecting object models from images or video of real-life objects, however, can be a difficult task. Some conventional image processing systems reconstruct objects by using an input image with a known camera pose by optimizing a photometric loss determined from the input image. These conventional systems often fail to learn accurate models for mapping images to three-dimensional reconstructions. Indeed, utilizing a photometric loss from a particular viewpoint often fails to generate an accurate reconstruction mapping of an object portrayed in a digital image. Moreover, conventional systems using a photometric loss from a single viewpoint have historically operated with regard to known, canonical objects. In other words, conventional systems lack flexibility to apply to objects without known shapes. Thus, conventional systems often lack flexibility to apply to new, unknown objects or topologies.

Some conventional image processing systems reconstruct objects by computing point clouds representing objects detected in one or more images and then constructing meshes from the point clouds. The use of point clouds often produces inaccurate meshes, because constructing a mesh from a point cloud can result in an overly-smoothed, blob-like, or merged mesh that erases important details from the object or combines multiple objects into a single mesh. Additionally, the conventional systems that use point clouds often produce inaccurate results when at least part of an object is occluded due to noise in depth data and possible holes that appear. These conventional systems may attempt to reduce the inaccuracies in the mesh by increasing the number of points in a point cloud corresponding to an object, but this increases the amount of computing resources needed to process the point cloud and generate the mesh while still suffering from some inaccuracies.

Furthermore, conventional image processing systems often introduce inaccuracies in downstream applications in utilizing a coordinate system defined with respect to the object. For example, multi-view stereo or SLAM-based systems typically utilize coordinates systems defined with respect to a particular input digital image. Unfortunately, many conventional image processing systems generate reconstruction geometries defined by coordinate systems relative to the center of mass of the object. This coordinate system inconsistency often leads to incompatibility and inaccuracies in utilizing these downstream applications.

SUMMARY

One or more embodiments provide benefits and/or solve one or more of the foregoing or other problems in the art with systems, methods, and non-transitory computer readable storage media that reconstruct three-dimensional scenes in a target coordinate system from images or video of real-life objects using multi-view, coordinate-aligned feature vectors. To illustrate, the disclosed systems can generate feature vectors for a plurality of images having different views of an object using an image encoder (e.g., a neural network encoder). The disclosed systems can process the feature vectors using a coordinate transform neural network to generate coordinate-aligned feature vectors that align coordinate systems from the feature vectors to a single coordinate system corresponding to a first image. The disclosed systems can generate a combined feature vector by combining the coordinate-aligned feature vectors with the feature vector corresponding to the first image. The disclosed systems can then utilize a surface generation neural network to generate a three-dimensional mesh representing the object from the combined feature vector. In this manner, the disclosed systems can improve the flexibility, accuracy, and efficiency of computing devices that reconstruct three-dimensional meshes from digital images or video portraying objects.

Additional features and advantages of one or more embodiments of the present disclosure will be set forth in the description below.

BRIEF DESCRIPTION OF THE DRAWINGS

Various embodiments will be described and explained with additional specificity and detail through the use of the accompanying drawings in which.

DETAILED DESCRIPTION

Figure 1:
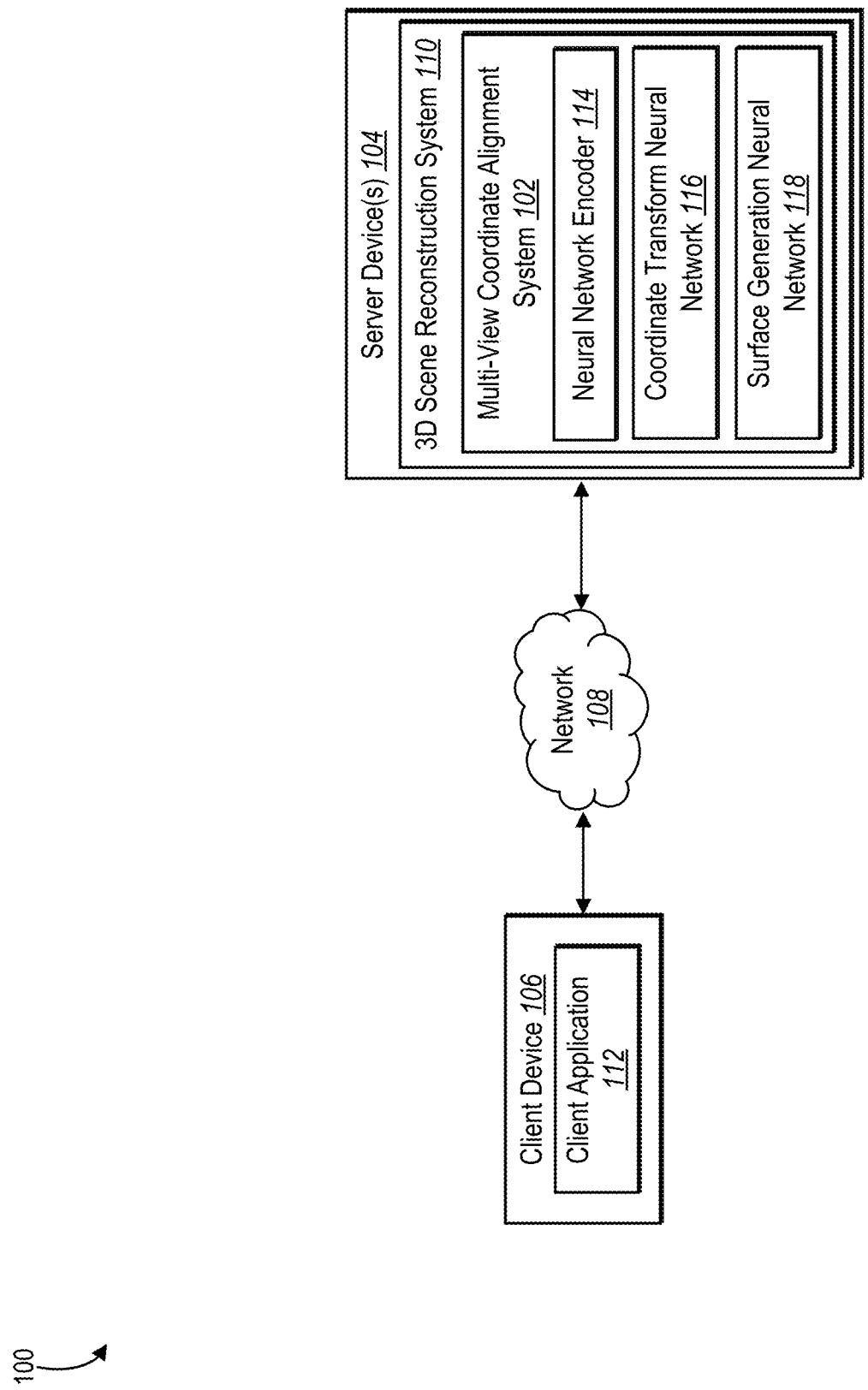
FIG. 1 illustrates an example system in which a multi-view coordinate alignment system can operate in accordance with one or more implementations.

One or more embodiments of the present disclosure include a multi-view coordinate alignment system that utilizes neural networks to generate a three-dimensional mesh by aligning feature vectors of images to a single coordinate system. In particular, the multi-view coordinate alignment system (or simply "coordinate alignment system") can generate a three-dimensional mesh from a sequence of images of an object by aligning a coordinate system of the mesh to a coordinate system from a first image in the sequence. For instance, the coordinate alignment system can generate feature vectors for the images using an image feature encoder (e.g., a neural network encoder). The coordinate alignment system can align coordinate system information associated with the feature vectors to a coordinate system of the first image by processing a feature vector and camera parameters of a second image to generate a coordinate-aligned feature vector for the second image. Additionally, the coordinate alignment system can combine the feature vector of the first image with the coordinate-aligned feature vector of the second image to create a combined feature vector. The coordinate alignment system can then generate a three-dimensional mesh of the object from the combined feature vector.

As mentioned, the coordinate alignment system can use an image feature encoder to generate feature vectors of images of an object. Specifically, the coordinate alignment system can identify a sequence of images that include different views of an object. In one or more embodiments, the coordinate alignment system can process the images using a neural network encoder to generate feature vectors (also sometimes referred to as latent vectors) that include encoded visual information about the object. Additionally, encoding the visual information from the images into feature vectors can also incorporate information about the corresponding perspectives of the object from the images into the feature vectors.

According to one or more embodiments, the coordinate alignment system can use a coordinate transform neural network to generate coordinate-aligned feature vectors relative to at least one image in the sequence of images. In particular, the coordinate alignment system can align a coordinate system of a three-dimensional mesh that the system generates from the sequence of images with a coordinate system corresponding to a first image of the sequence of images. To illustrate, the coordinate alignment system can process the feature vectors and camera parameters of images other than the first image using a coordinate transform neural network to generate coordinate-aligned feature vectors. Thus, the coordinate alignment system can generate new feature vectors for one or more images that align the coordinate systems of the new feature vectors to a feature vector of the first image.

Furthermore, in one or more embodiments, the coordinate alignment system can combine feature vectors of the sequence of images to generate a combined feature vector representing the entire sequence. For instance, the coordinate alignment system can utilize a pooling layer (e.g., an average pooling layer) to combine the feature vector of the first image and the new coordinate-aligned feature vectors of the other images. Because the coordinate alignment system generates the new feature vectors to have coordinate system information aligned to the coordinate system of the first image, the combined feature vector can also be coordinate-aligned to the coordinate system of the first image.

Once the coordinate alignment system has generated the combined feature vector, in one or more embodiments, the coordinate alignment system can then generate a three-dimensional mesh representing the object. Specifically, the coordinate alignment system can utilize a surface generation neural network to process the combined feature vector to generate the three-dimensional mesh. More specifically, the coordinate alignment system can use the surface generation neural network to process the combined feature vector with surface mapping coordinates to generate a three-dimensional mesh that has a coordinate system aligned with the coordinate system of the first image.

The disclosed coordinate alignment system can provide a number of advantages over conventional systems. For example, the coordinate alignment system can improve accuracy relative to conventional systems that render three-dimensional models from two-dimensional scenes. To illustrate, with regard to conventional systems that utilize an image to determine a photometric loss, the coordinate alignment system can more accurately generate three-dimensional meshes by generating three-dimensional models that reflects views from multiple different images while having a coordinate system accurately aligned to a coordinate system of one of the images. Indeed, the coordinate alignment system generates a three-dimensional model with an aligned coordinate system without requiring manual alignment of coordinate systems.

Additionally, the coordinate alignment system can improve flexibility relative to conventional systems. For instance, the coordinate alignment system can modify a neural network encoder, a coordinate transform neural network, and/or a surface generation neural network to more accurately generate feature vectors for learning and predicting three-dimensional meshes. Thus, the coordinate alignment system can flexibly modify the resulting shape to align with a specific coordinate system from multiple views of an object. Accordingly, the coordinate alignment system can more flexibly apply to accurately generate three-dimensional meshes even without known, canonical shapes.

Furthermore, in contrast to conventional systems that generate three-dimensional models from point clouds, the coordinate alignment system uses a plurality of views of an object in a process that results in more accurate and efficient generation of three-dimensional meshes of objects without requiring manual alignment. Specifically, the coordinate alignment system uses a coordinate alignment process that incorporates an end-to-end trainable model (including a neural network encoder, a coordinate transform neural network, and a surface generation neural network) to generate a three-dimensional mesh having a coordinate system accurately aligned to a coordinate system of one of the images while detecting finer details that are often missed by conventional systems that use point clouds. Additionally, by directly learning a mesh of an object or scene from images, in contrast to first converting to a point cloud representation as in the conventional systems, the coordinate alignment system can accurately detect and mesh objects even when portions of the objects are occluded by foreground elements.

In addition to improving accuracy, the coordinate alignment system can improve the efficiency of computing devices rendering three-dimensional models from two-dimensional scenes. In particular, by utilizing neural networks to align a coordinate system of a mesh to a coordinate system from an image in a sequence of images, the coordinate alignment system can incorporate detailed object information into the mesh while also centering the mesh based on a camera position of an image. To illustrate, because the coordinate alignment system uses a multi-view coordinate alignment process to improve parameters of one or more of the neural networks in directly generating a mesh from multiple images, the coordinate alignment system can more quickly and accurately generate a mesh of an object with fewer computing resources (e.g., by handling fewer data points) than conventional systems that use unstructured point clouds that are then converted to meshes.

Furthermore, the coordinate alignment system can improve compatibility and accuracy with regard to other downstream applications. Indeed, because the coordinate alignment system can generate three-dimensional meshes in a coordinate system of a first digital image, the resulting mesh can be efficiently utilized with respect to multi-view stereo or SLAM-base applications that utilize coordinate systems defined with respect to a particular input image.

As illustrated by the foregoing discussion, the present disclosure utilizes a variety of terms to describe features and advantages of the coordinate alignment system. Additional detail is now provided regarding the meaning of such terms. For example, as used herein, the term "image" refers to a two-dimensional, digital visual representation. Specifically, an image can include a digital image of a scene including one or more objects (e.g., real-world objects). In one or more embodiments, an image can include a single digital image frame of a digital video (e.g., a digital video can include a plurality of sequential digital image frames of a scene.

As used herein, the term "neural network" refers to a computer algorithm that can be tuned (e.g., trained) based on inputs to approximate unknown functions. In particular, a neural network can include a machine-learning model that utilizes algorithms to learn from, and make predictions on, known data by analyzing the known data to learn to generate outputs that reflect patterns and attributes of the known data. For instance, a neural network can include, but is not limited to, a convolutional neural network, a recurrent neural network, a generative adversarial neural network, a variational auto-encoder, a feed forward neural network, a multi-layer perceptron, or a graph neural network. A neural network learns high-level abstractions in data to generate data-driven predictions or decisions from the known input data.

As used herein, the terms "encoder," "neural network encoder," and "image feature encoder" refer to a computing component that generates a latent vector representation of an object from a digital image. For example, an encoder can process an image to encode visual features of one or more objects (e.g., the appearance of an object) in the image as a feature map representation. To illustrate, in one or more embodiments, an encoder can include a residual neural network ("ResNet"), as described in "Deep Residual Learning for Image Recognition" by Kaiming He, Xiangyu Zhang, Shaoqing Ren, and Jian Sun, which is incorporated by reference herein. As used herein, the term "feature vector" (or latent vector, latent feature vector, feature map, or feature representation) refers to a feature vector that represents a two-dimensional image. For instance, a feature vector can include a fixed length representation of one or more of the two-dimensional images of an object portrayed in a digital image. Furthermore, as used herein, the term "combined feature vector" refers to a feature vector generated from a plurality of feature vectors. To illustrate, a combined feature vector can be based on a pooling (e.g., average pooling) of two or more other feature vectors.

Additionally, as used herein, the term "coordinate transform neural network" refers to a neural network that generates a coordinate-aligned feature vector from an original feature vector of an image. In particular, the coordinate transform neural network can include a latent spatial coordinate transform neural network (e.g., a multilayer perceptron) that processes a feature vector of an image and camera parameters associated with the image to create a new feature vector that aligns coordinate system information in the new feature vector to coordinate system information associated with a feature vector of another image. In one or more embodiments, the coordinate transform neural network includes parameters learned based on the first image (e.g., based on camera parameters associated with the first image). Also as used herein, the term "coordinate-aligned feature vector" refers to a feature vector utilized to align coordinate systems of a digital image to another digital image. For example, a coordinate-aligned feature vector can include a latent representation of coordinate system information aligned to specific camera parameters. For example, a coordinate-aligned feature vector can be a new or modified feature vector based on a coordinate transform neural network processing an original feature vector and camera parameters of the image.

Additionally, as used herein, the term "surface generation neural network" refers to a neural network that estimates a three-dimensional mesh of an object (e.g., by processing a feature vector representation of the object). For example, a surface generation neural network can include a neural network that reconstructs a mesh from a feature vector (e.g., a combined feature vector) constructed from a neural network encoder. Moreover, a surface generation neural network can also utilize a projection between coordinates of a surface mapping space (e.g., UV coordinates) and coordinates of three-dimensional mesh to identify a three-dimensional coordinate corresponding to a pixel of an object portrayed in an image. In one or more embodiments, a surface generation neural network can include a neural network, such as a decoder neural network, to generate the estimated three-dimensional mesh for the object, as described in "AtlasNet: A Papier-Mâché Approach to Learning 3D Surface Generation" by Thibault Groueix, Matthew Fisher, Vladimir Kim, Bryan Russell, and Mathieu Aubry in CVPR 2018, which is incorporated by reference herein.

As used herein, the term "three-dimensional mesh" refers to a digital representation of an object in three dimensions. For example, a three-dimensional mesh can include a collection of vertices, edges, and faces that define the shape of the object in three dimensions. Specifically, a three-dimensional mesh typically includes a number of vertices (or individual points) that connect to form edges, which then define of faces representing a surface of the object. A computing device can then render a three-dimensional mesh by rendering lines for edges and/or the faces.

As used herein, the term "surface mapping coordinates" refers to a coordinates within a coordinate space that includes a two-dimensional representation of a surface of a three-dimensional object. In particular, surface mapping coordinates can include two-dimensional coordinates in a surface mapping space with one or more shapes that correspond to one or more portions of a three-dimensional mesh. Additionally, in one or more embodiments, surface mapping coordinates can include (u,v) coordinates within a UV space. To illustrate, a surface mapping space can include a grid with values in each coordinate direction from 0 to 1 (e.g., with boundary corners at (0,0), (0,1), (1,0), and (1,1)). The coordinate alignment system can utilize a surface generation neural network processing a feature vector in connection with coordinate data from a surface mapping space to determine a three-dimensional mesh based on a mapping between surface mapping coordinates and corresponding three-dimensional coordinates in a three-dimensional space.

Also as used herein, the term "camera parameters" refers to data describing a camera pose for an image. Specifically, camera parameters can include a location of a camera, a direction of the camera, viewing angle, or other parameters that describe a view of an object within an image. Additionally, each image in a sequence of images can have unique camera parameters based on the view of the object within the image. Furthermore, as used herein, the term "coordinate system" refers to an orientation of three-dimensional coordinates and an origin location of the three-dimensional coordinates. In one or more embodiments, a coordinate system can be associated with an image (e.g., used in image processing) or a three-dimensional mesh in a three-dimensional space (e.g., (x,y,z) coordinate system). To illustrate, a coordinate system for an image can have an origin located at camera center of a view in the image. Although many of the examples utilized herein describe a Cartesian coordinate system, the coordinate alignment system can also operate with regard to a variety of other coordinate systems, such as a polar coordinate system or a spherical coordinate system.

Additional detail will now be provided regarding the coordinate alignment system in relation to illustrative figures portraying exemplary implementations. To illustrate, FIG. 1 includes an embodiment of a system environment 100 in which a multi-view coordinate alignment system 102 (or simply "coordinate alignment system 102") operates. In particular, the system environment 100 includes server device(s) 104 and a client device 106 in communication via a network 108. Moreover, as shown, the server device(s) 104 include a three-dimensional scene reconstruction system (or "3D scene reconstruction system 110"), which includes the coordinate alignment system 102. Additionally, the client device 106 can include a client application 112.

As shown in FIG. 1, the server device(s) 104 include the 3D scene reconstruction system 110. The 3D scene reconstruction system 110 can include, or be part of, one or more systems that implement the reconstruction of three-dimensional scenes from digital images. For example, the 3D scene reconstruction system 110 can analyze two-dimensional digital images of scenes including one or more objects to generate three-dimensional models representing the objects. The, 3D scene reconstruction system 110 can then use the three-dimensional models in a variety of applications such as databases of three-dimensional assets, virtual or augmented reality environments, or other environments that utilize three-dimensional models. In one or more embodiments, the 3D scene reconstruction system 110 can provide reconstructed three-dimensional models to another system such as a system at the server device(s) 104 or a third-party system.

In connection with implementing three-dimensional environments using reconstructed three-dimensional models, the 3D scene reconstruction system 110 can receive digital images from the client device 106 via the network 108 to use in identifying objects. For example, the client device 106 can capture, or otherwise obtain, digital images of a real-world scene that includes one or more objects. In one or more embodiments, the client device 106 can include an image capture device that captures digital images or digital video. The client device 106 can then provide the digital images to the 3D scene reconstruction system 110 (e.g., using the client application 112) via the network 108.

In response to receiving the data from the client device 106, the 3D scene reconstruction system 110 can provide the received data to the coordinate alignment system 102 for detecting one or more objects in the received data and rendering the object(s) as three-dimensional meshes. For example, the coordinate alignment system 102 can perform object detection and reconstruction on two or more images having different perspectives of an object. To illustrate, the coordinate alignment system 102 can use a neural network encoder 114 to process digital images of an object to generate feature vectors of the digital images. The coordinate alignment system 102 can then utilize a coordinate transform neural network 116 to process one or more feature vectors and generate one or more coordinate-aligned feature vectors. Additionally, the coordinate alignment system 102 (e.g., via a pooling layer, as explained in more detail below) can also combine a plurality of feature vectors (original and/or coordinate-aligned feature vectors) to create a combined feature vector.

In one or more embodiments, after generating a combined feature vector aligning coordinate data from feature vectors of a plurality of images of an object, the coordinate alignment system 102 can utilize a surface generation neural network 118 to generate an estimated three-dimensional mesh. For example, the coordinate alignment system 102 can utilize the surface generation neural network 118 to process the combined feature vector and surface mapping coordinates in a surface mapping space to generate the three-dimensional mesh. Accordingly, the coordinate alignment system can generate a three-dimensional mesh representing an object from a plurality of images having different views of an object and aligning a coordinate system of the mesh to a coordinate system from one of the images.

In one or more embodiments, the coordinate alignment system 102 can also train each of the neural networks by learning parameters of the neural networks. For instance, the coordinate alignment system 102 can process images having a ground truth object and ground truth camera parameters using the neural network encoder, the coordinate transform neural network, and the surface generation neural network to generate an estimated three-dimensional mesh of the ground truth object. The coordinate alignment system 102 can determine a loss associated with the generated mesh by comparing the mesh to the ground truth object. The coordinate alignment system 102 can then use the loss to update parameters of one or more of the neural networks. In one or more embodiments, the coordinate alignment system 102 can perform any number of learning steps (e.g., repeating the mesh estimation and parameter update steps), as may serve a particular embodiment.

In response to the coordinate alignment system 102 performing processes for generating a three-dimensional mesh representing an object detected in a digital image, the 3D scene reconstruction system 110 can provide the mesh to the client device 106 via the network 108. According to one or more embodiments, the 3D scene reconstruction system 110 provides the mesh to the client device 106 for display within the client application 112 on a display device of the client device 106. Additionally, the 3D scene reconstruction system 110 can perform additional operations on the mesh prior to providing the mesh to the client device 106, such as by applying modifiers to the object mesh (e.g., smoothing the mesh), texturing the mesh, coloring the mesh, or inserting the mesh into a three-dimensional environment. In one or more additional embodiments, the 3D scene reconstruction system 110 can store the mesh in a database of three-dimensional models for later use.

In one or more embodiments, the server device(s) 104 include a variety of computing devices, including those described below with reference to FIG. 8. For example, the server device(s) 104 can include one or more servers for storing and processing data associated with digital image analysis and three-dimensional imaging applications. The server device(s) 104 can also include a plurality of computing devices in communication with each other, such as in a distributed storage environment. Furthermore, the server device(s) 104 can include devices and/or components in connection with one or more neural network(s) (e.g., the neural network encoder 114, the coordinate transform neural network 116, and/or the surface generation neural network 118) and training data for training the neural network(s). In some embodiments, the server device(s) 104 comprise a content server. The server device(s) 104 can also comprise an application server, a communication server, a web-hosting server, a social networking server, a digital content campaign server, or a digital communication management server.

As mentioned, the server device(s) 104 can include components associated with neural networks and training data for training one or more neural networks. In one or more embodiments, the server device(s) 104 (e.g., implementing the coordinate alignment system 102 or another system) train the neural network encoder 114, the coordinate transform neural network 116, and/or the surface generation neural network 118. The server device(s) 104 can also train the neural network(s) using previously generated or labeled training data such three-dimensional models generated for objects captured in digital images (e.g., objects derived from the models). In addition to utilizing one or more training datasets, the server device(s) 104 can utilize a verification dataset and a testing dataset for verifying and testing training of the neural network(s), respectively.

In addition, as shown in FIG. 1, the system environment 100 includes the client device 106. The client device 106 can include, but is not limited to, a mobile device (e.g., smartphone or tablet), a laptop, a desktop, including those explained below with reference to FIG. 6. Furthermore, although not shown in FIG. 1, the client device 106 can be operated by a user (e.g., a user included in, or associated with, the system environment 100) to perform a variety of functions. In particular, the client device 106 can perform functions such as, but not limited to, accessing, viewing, and interacting with a variety of digital content (e.g., digital images, digital video, three-dimensional imaging environments, virtual/augmented reality environments). The client device 106 can also perform functions for generating, capturing, or accessing data to provide to the 3D scene reconstruction system 110 and the coordinate alignment system 102 in connection with virtual/augmented reality environments. For example, the client device 106 can communicate with the server device(s) 104 via the network 108 to provide information associated with digital images, digital video, or three-dimensional environments. Although FIG. 1 illustrates the system environment 100 with a single client device 106, the system environment 100 can include a different number of client devices.

Additionally, as shown in FIG. 1, the system environment 100 includes the network 108. The network 108 can enable communication between components of the system environment 100. In one or more embodiments, the network 108 may include the Internet or World Wide Web. Additionally, the network 108 can include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 may communicate via the network using a variety of communication platforms and technologies suitable for transporting data and/or communication signals, including any known communication technologies, devices, media, and protocols supportive of data communications, examples of which are described with reference to FIG. 6.

Although FIG. 1 illustrates the server device(s) 104 and the client device 106 communicating via the network 108, the various components of the coordinate alignment system 102 can communicate and/or interact via other methods (e.g., the server device(s) 104 and the client device 106 can communicate directly). Furthermore, although FIG. 1 illustrates the coordinate alignment system 102 being implemented by a particular component and/or device within the system environment 100, the coordinate alignment system 102 can be implemented, in whole or in part, by other computing devices and/or components in the system environment 100 (e.g., the client device 106). Additionally, the neural network encoder 114, the coordinate transform neural network 116, and/or the surface generation neural network 118 may be implemented at the server device(s) 104 or at one or more other server devices or systems.

Figure 2:
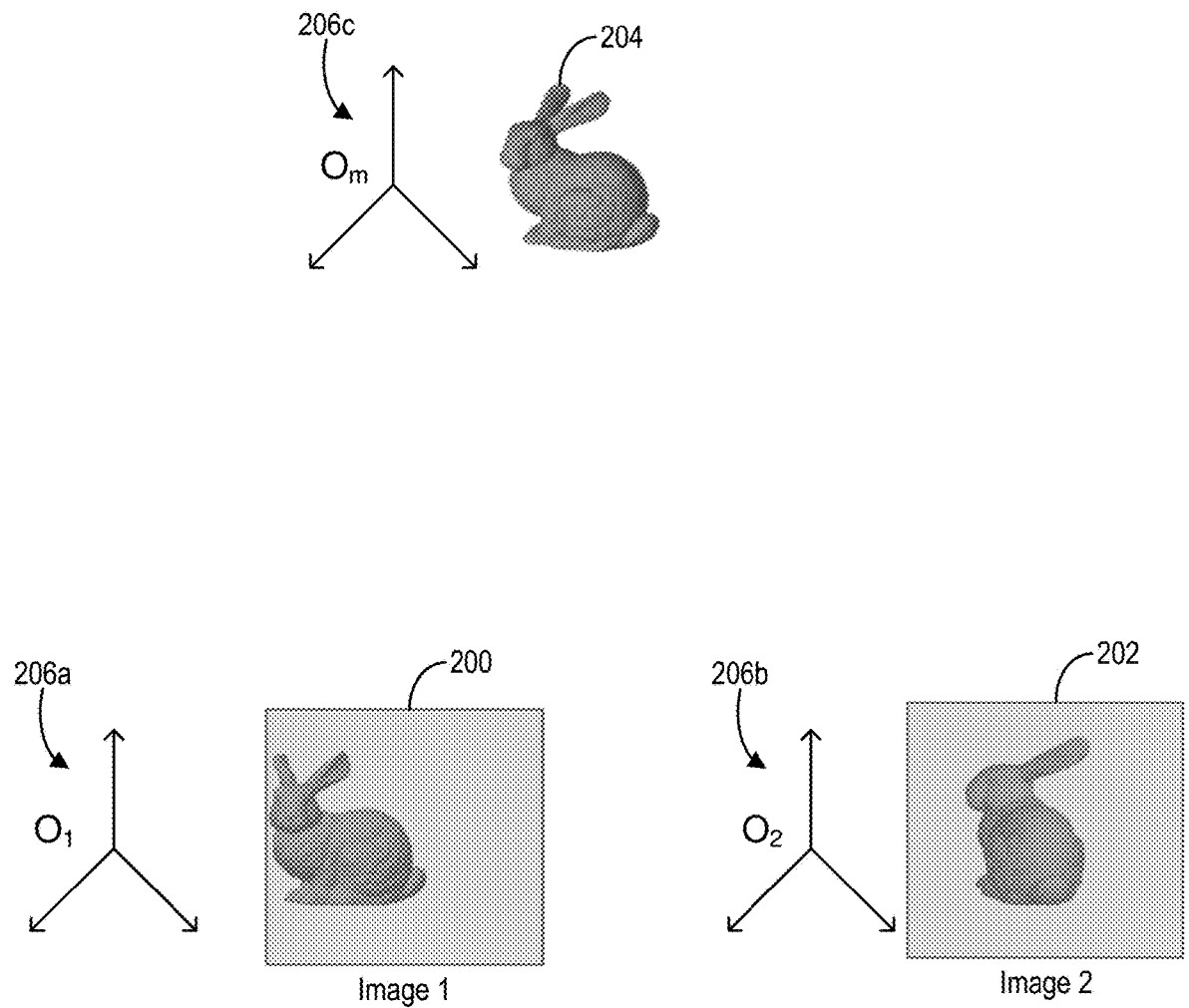
FIG. 2 illustrates a diagram of an overview of coordinate systems associated with a plurality of images and a three-dimensional mesh prior to coordinate alignment in accordance with one or more implementations.

As mentioned above, the coordinate alignment system 102 can accurately reconstruct three-dimensional meshes from two-dimensional digital images while aligning a coordinate system of the resulting mesh to a coordinate system of one of the images. FIG. 2 illustrates an overview of coordinate systems associated with a sequence of digital images and a three-dimensional mesh of an object. Specifically, FIG. 2 illustrates a first image 200 of an object, a second image 202 of the object, and a three-dimensional mesh 204 representing the object.

In one or more embodiments, a sequence of images (e.g., video frames from a digital video) can include one or more views of an object (or objects). For example, an image capture device can capture a plurality of images of an object from a number of different views. In one or more embodiments, the image capture device can move while capturing video of the object to capture different surfaces or portions of the object (e.g., a front, side, and/or back of an object). To illustrate, the first image 200 can include a first view of the object, and the second image 202 can include a second view of the object that is different than the first view.

Camera parameters associated with each digital image are based on the position and perspective of the image capture device. Accordingly, if images have different views of an object, the camera parameters associated with each image are different to reflect/describe the different views. For instance, the first image 200 has a first set of camera parameters based on the first view of the object, and the second image 202 has a second set of camera parameters based on the second view of the object.

Additionally, as mentioned, each image can be associated with a coordinate system. In particular, the coordinate system for an image can be based on the view of the image. For example, a coordinate system for an image can be based on a camera center associated with a view in the image. The coordinate system can also correspond to a three-dimensional representation of an object or scene within the image in connection with image processing of the image with the origin based on the camera center. Thus, the coordinate alignment system can process a two-dimensional digital image to identify positioning of one or more objects relative to the coordinate system. In one or more embodiments, the coordinate alignment system can determine a coordinate system based on the camera parameters associated with an image.

To illustrate, the first image 200 can have a first coordinate system 206a with the object at a specific location and orientation relative to the first coordinate system 206a. Additionally, the second image 202 can have a second coordinate system 206b with the object at a specific location and orientation relative to the second coordinate system 206b. Furthermore, the three-dimensional mesh 204 that the coordinate alignment system 102 generates can have a third coordinate system 206c with the object at a specific location and orientation relative to the third coordinate system 206c.

As previously mentioned, some conventional systems generate three-dimensional representations with coordinate system origins at a center of a generated object. As described in more detail below, the coordinate alignment system 102 can automatically align a mesh coordinate system with a coordinate system of an image using neural networks. Thus, as an example, the coordinate alignment system 102 can use a neural network encoder, a coordinate transform neural network, and a surface generation neural network to automatically align the third coordinate system 206c with the first coordinate system 206a.

Figure 3:
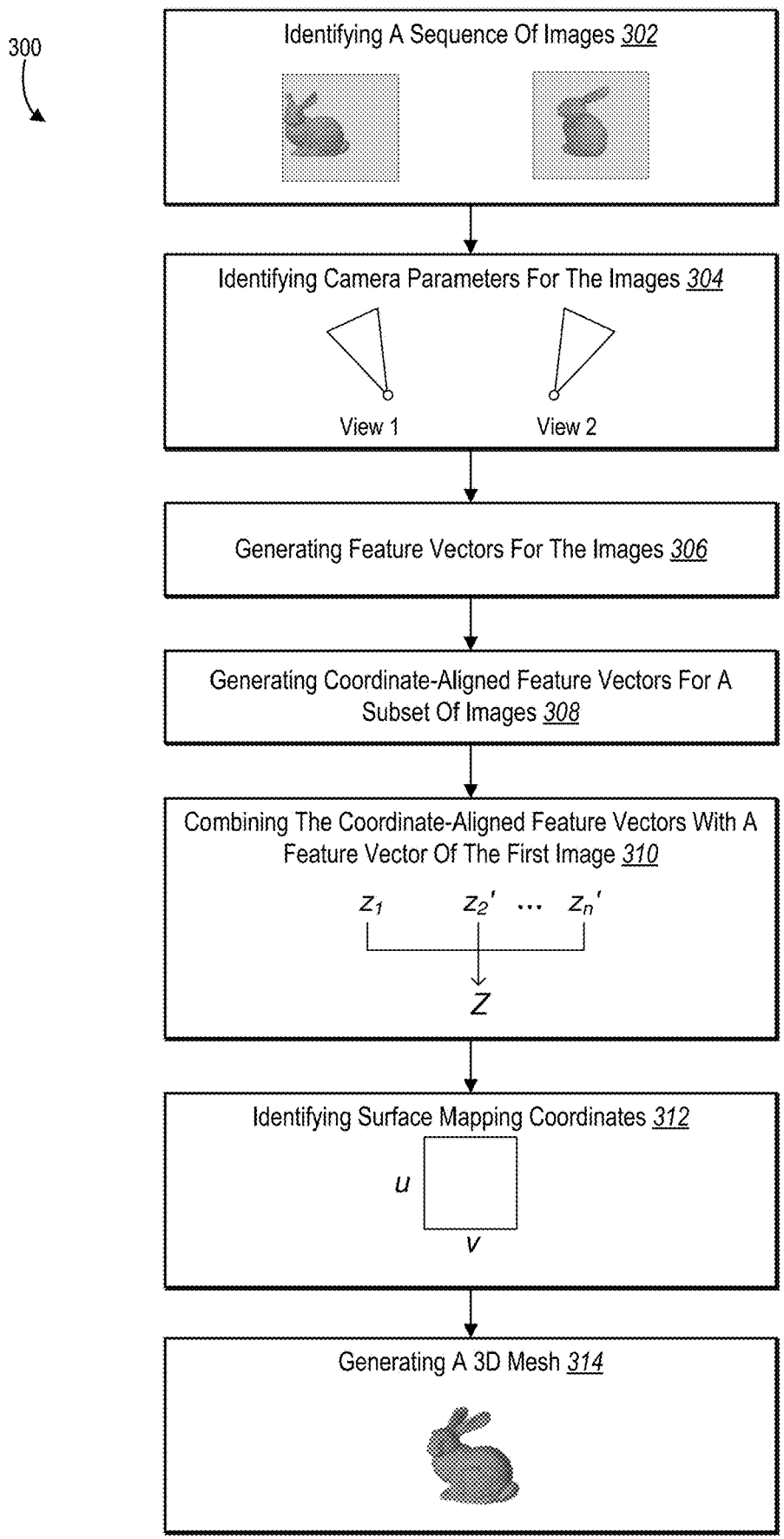
FIG. 3 illustrates a diagram of an overview of a process for generating a three-dimensional mesh using coordinate-aligned feature vectors for a plurality of images in accordance with one or more implementations.

FIG. 3 illustrates an overview of a process for generating a three-dimensional mesh of an object from a plurality of two-dimensional digital images while aligning a coordinate system of the three-dimensional mesh to a coordinate system of one of the digital images. Specifically, FIG. 3 illustrates that the coordinate alignment system 102 can generate feature vectors for the images and then align the feature vectors to a coordinate system of an image. FIG. 3 further illustrates that the coordinate alignment system 102 can combine the feature vectors aligned to the coordinate system of the image and then use the combined feature vector and surface mapping coordinates to generate a three-dimensional mesh.

In one or more embodiments, as shown in FIG. 3, the coordinate alignment system 102 performs a series of acts 300 to generate a three-dimensional mesh aligned to a specific coordinate system based on a plurality of images. In particular, the series of acts 300 can include an act 302 of identifying a sequence of images. For example, as previously mentioned, the coordinate alignment system 102 can access images captured using one or more image capture devices. In one or more embodiments, the sequence of images can include video frames in a video of an object. Alternatively, the sequence of images can include individually captured still-frame images. The coordinate alignment system 102 can include the image capture device(s) or communicate with another system or device to obtain the sequence of images. Additionally, the coordinate alignment system 102 can identify the images as they are captured, such that the coordinate alignment system 102 obtains earlier captured images prior to later captured images.

According to one or more embodiments, as shown in FIG. 3, the series of acts 300 can also include an act 304 of identifying camera parameters for the images. To illustrate, in one or more embodiments, the coordinate alignment system 102 can obtain camera parameters for the images from an image capture device(s) used to capture the images or from another source that provides known camera parameters. In one or more alternative embodiments, the coordinate alignment system 102 can obtain camera parameters using image processing techniques. In any case, the coordinate alignment system 102 can determine the camera parameters for each image in the sequence of images and store the camera parameters with the corresponding images.

In one or more embodiments, as FIG. 3 illustrates, the series of acts 300 can include an act 306 of generating feature vectors for each image in the sequence of images. Specifically, the coordinate alignment system 102 can utilize an image feature encoder, such as a neural network encoder, that encodes visual characteristics of an image into a feature vector representation of the image. In one or more embodiments, as previously mentioned, the coordinate alignment system 102 can utilize a neural network such as ResNet, a convolutional neural network, a dense neural network, or other neural network that processes digital images to encode visual information about objects within the digital images into feature vectors. To illustrate, the coordinate alignment system 102 can use the neural network to generate a unique, fixed length feature vector (e.g., a feature vector having 1000 dimensions) that represents the visual information of the digital image. Accordingly, the coordinate alignment system 102 can generate a unique feature vector for each image in the sequence of images.

FIG. 3 further illustrates that the series of acts 300 can include an act 308 of generating coordinate-aligned feature vectors for a subset of images in the sequence of images. In particular, the coordinate alignment system 102 can] generate a three-dimensional mesh according to a particular coordinate system associated with one of the images. The coordinate alignment system 102 can thus identify a subset of images from the sequence of images that are not associated with the particular coordinate system. For example, the coordinate alignment system 102 can determine to generate a three-dimensional mesh aligned to a coordinate system associated with a first image in a sequence of images. The coordinate alignment system 102 can then identify the subset of images as any images in the sequence other than the first image (e.g., a second image and a third image).

Although this disclosure often refers to a "first image" in a sequence of images, "first" is not intended to denote an order (e.g., a temporal order) within the sequence. Indeed, a "first image" can be captured after a "second image" or a "third image" as a matter of time or sequence. In other words, a "first image" can refer to any target image associated with a target coordinate system that the coordinate alignment system utilizes to generate a three-dimensional mesh within the target coordinate system.

In response to identifying the subset of images, the coordinate alignment system 102 can then generate coordinate-aligned feature vectors for the subset of images. Specifically, the coordinate alignment system 102 aligns coordinate information associated with the feature vectors of the subset of images with the selected coordinate system by generating new feature vectors for the images. In one or more embodiments, the coordinate alignment system 102 can generate a coordinate aligned feature vector for an image by utilizing a coordinate transform neural network to process the original feature vector and camera parameters for the image. For example, the coordinate transform neural network can take a feature vector and corresponding camera parameters of an image as inputs and then output a new feature vector.

FIG. 3 illustrates that, after generating one or more coordinate-aligned feature vectors for a subset of images, the series of acts 300 can include an act 310 of combining the coordinate-aligned feature vectors with a feature vector of the first image. In one or more embodiments, the coordinate alignment system 102 can combine a plurality of feature vectors associated with the sequence of images to generate a single feature vector representing the sequence of images. For example, the coordinate alignment system 102 can combine an original feature vector corresponding to the first image that is associated with the selected coordinate system with the newly generated coordinate-aligned feature vectors corresponding to the other images. To illustrate, the coordinate alignment system 102 can combine the feature vectors using a pooling method (e.g., average pooling).

As FIG. 3 further illustrates, the series of acts 300 can also include an act 312 of identifying surface mapping coordinates. In particular, the coordinate alignment system 102 can identify surface mapping coordinates corresponding to a base three-dimensional shape. For example, the coordinate alignment system 102 can classify the object in the sequence of images in a geometry classification corresponding to a base shape (e.g., a sphere). The coordinate alignment system 102 can then identify surface mapping coordinates that map three-dimensional coordinates on one or more surfaces of the base shape to a two-dimensional surface mapping space.

Additionally, FIG. 3 illustrates that the series of acts 300 can include an act 314 of generating a three-dimensional ("3D") mesh. Specifically, the coordinate alignment system 102 can utilize a surface generation neural network to decode the combined feature vector. In one or more embodiments, the coordinate alignment system 102 can generate the three-dimensional mesh by using the surface generation neural network (e.g., "AtlasNet") to process the combined feature vector in connection with the surface mapping coordinates. To illustrate, the coordinate alignment system 102 can initialize the surface generation neural network using the base shape of the geometry classification. The surface generation neural network can then modify the surface mapping coordinates corresponding to the base shape (e.g., update the mapping between the surface mapping space and the three-dimensional space) based on the combined feature vector, which changes the base shape to the estimated three-dimensional mesh representing the object in the images. Thus, the coordinate alignment system 102 can "wrap" one or more surfaces in the surface mapping space to fit the surface of a three-dimensional mesh representing the object.

Figure 4:
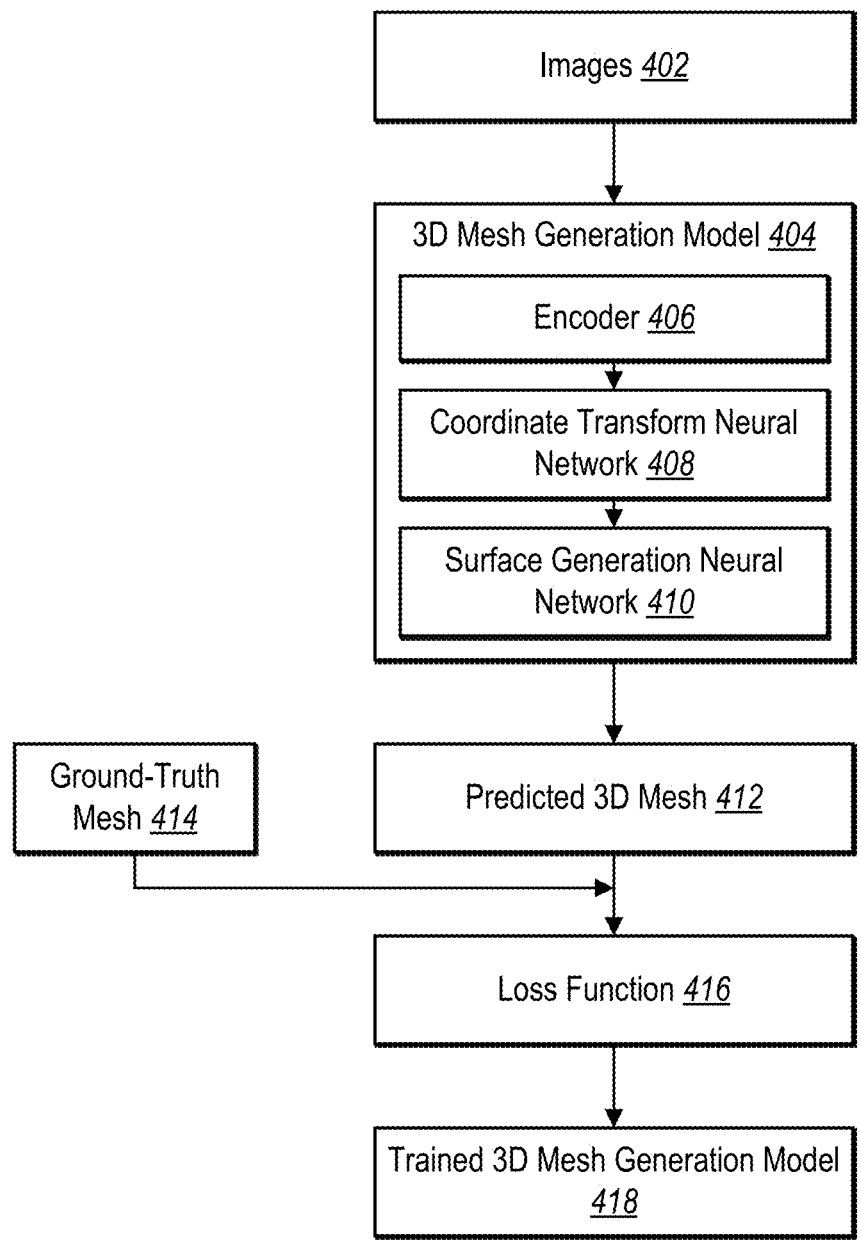
FIG. 4 illustrates a diagram of learning parameters of a 3D mesh generation model in accordance with one or more implementations.

According to one or more embodiments, the coordinate alignment system 102 can also train one or more of the neural networks that the coordinate alignment system 102 uses to generate coordinate-aligned three-dimensional meshes based on sequences of two-dimensional images. FIG. 4 illustrates an overview of a process of learning parameters of a plurality of neural networks for aligning coordinate systems of three-dimensional meshes based on two-dimensional images. In particular, FIG. 4 illustrates a process for generating a three-dimensional mesh using a model of neural networks, comparing the mesh to a ground-truth mesh to obtain a loss function, and then training the model based on the loss function.

In one or more embodiments, as illustrated in FIG. 4, the coordinate alignment system 102 utilizes a set of images 402 associated with known object data. For example, the images 402 can be part of a training dataset having labeled object data associated with one or more objects within the images 402. Additionally, the images 402 can be part of a sequence of images depicting the one or more objects from different views/perspectives. In one or more embodiments, the coordinate alignment system 102 can also have access to camera parameters associated with the images 402.

FIG. 4 illustrates that the coordinate alignment system 102 can use the images 402 as inputs to a three-dimensional mesh generation model 404. The three-dimensional mesh generation model 404 can include an encoder 406 (e.g., a neural network encoder, as previously mentioned), a coordinate transform neural network 408, and a surface generation neural network 410. The three-dimensional mesh generation model 404 can process the images 402 using the operations described above with respect to FIG. 3. In particular, the encoder 406 can generate feature vectors for the images 402, the coordinate transform neural network 408 can generate coordinate-aligned feature vectors for a subset of the images 402, and the surface generation neural network 410 can process a combined feature vector and surface mapping coordinates to generate a predicted three-dimensional mesh 412.

After generating the predicted three-dimensional mesh 412 of the object in the images 402, the coordinate alignment system 102 can compare the predicted three-dimensional mesh 412 to a ground-truth mesh. The ground-truth mesh 414 can be a three-dimensional mesh representing an object in the images 402 that has been manually labeled/generated and/or labeled/generated using another method for verifying the accuracy of the ground-truth model. The coordinate alignment system 102 can thus compare the predicted three-dimensional mesh 412 to an accurate representation of the object to determine an accuracy of the three-dimensional mesh generation model 404. Moreover, the ground-truth mesh 414 can be generated in the same coordinate system as a particular digital image (e.g., in the same coordinate frame as a first camera utilized to capture a first digital image).

In one or more embodiments, when comparing the predicted three-dimensional mesh 412 to the ground-truth mesh 414, the coordinate alignment system 102 can determine a loss function 416 (e.g., based on a chamfer loss or other loss function) associated with the predicted three-dimensional mesh 412. More specifically, to determine a chamfer loss, the coordinate alignment system 102 can compare each predicted three-dimensional point in the predicted three-dimensional mesh 412 to a closest three-dimensional point in the ground-truth mesh 414 to determine a minimum "L2" distance for the predicted three-dimensional point. The coordinate alignment system 102 can then sum up the minimum L2 distances for every point in the predicted three-dimensional mesh 412 to determine the total chamfer loss for the predicted three-dimensional mesh 412.

After determining the loss function 416 (e.g., based on the chamfer loss or another loss function), the coordinate alignment system 102 can then create a trained three-dimensional mesh generation model 418 using the loss function 416, as illustrated in FIG. 4. For instance, in one or more embodiments, the coordinate alignment system 102 can use the loss function 416 to update parameters in one or more of the neural networks in the three-dimensional mesh generation model 404. To illustrate, the coordinate alignment system 102 can utilize an end-to-end training process to update the parameters of each neural network. Updating the parameters can include fine-tuning the parameters of the encoder 406, learning/updating the parameters of the coordinate transform neural network 408, and/or fine-tuning the parameters of the surface generation neural network 410 by backpropagating the chamfer loss through the individual neural networks. The coordinate alignment system 102 can continue updating parameters of the neural networks (e.g., via the process described above) until the predicted three-dimensional mesh 412 aligns with the ground-truth mesh 414.

In one or more embodiments, the coordinate alignment system 102 can utilize one or more pre-trained neural networks (e.g., the encoder 406 and/or the surface generation neural network 410) that are trained based on datasets of three-dimensional shapes and/or shapes that have rendered views. Additionally, the coordinate alignment system 102 can utilize a neural network that the coordinate alignment system 102 trains/generates fully based on the images 402 (e.g., the coordinate transform neural network). For instance, the coordinate alignment system 102 can pre-train the encoder 406 and the surface generation neural network 410 and then tweak (e.g., learn modified parameters) of the encoder 406 and the surface generation neural network 410 while training the coordinate transform neural network 408

Figure 5:
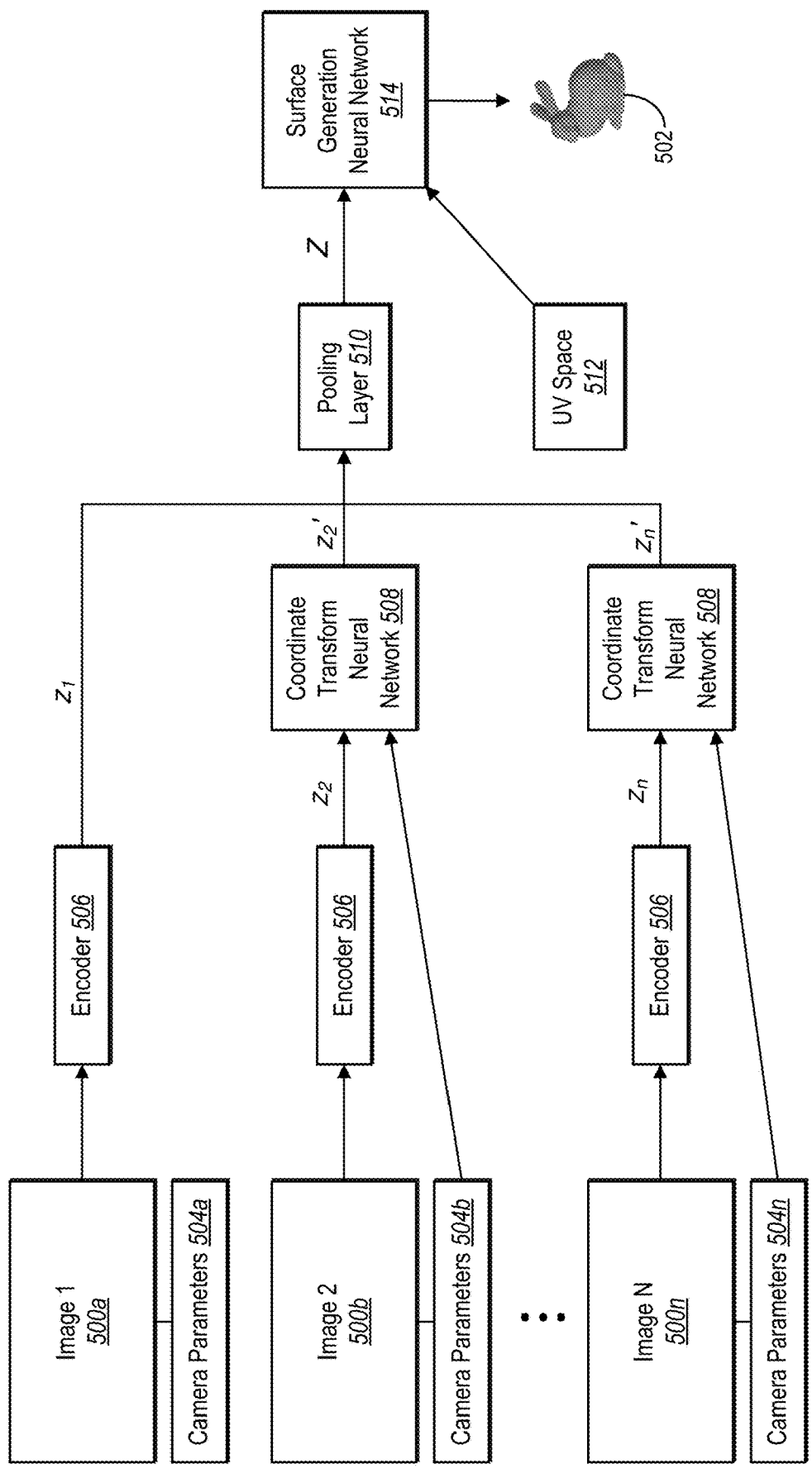
FIG. 5 illustrates a diagram of generating a three-dimensional mesh using coordinate-aligned feature vectors for a plurality of images in accordance with one or more implementations.

FIG. 5 illustrates a more detailed representation of generating a three-dimensional mesh of an object from a plurality of images while aligning a coordinate system of the three-dimensional mesh to a coordinate system of one of the images. As illustrated, in FIG. 5, for example, the coordinate alignment system 102 can process a plurality of images 500a-500n using neural networks in a feed forward fashion to generate a predicted three-dimensional mesh 502 of an object depicted within the plurality of images 500a-500n. The coordinate alignment system 102 can generate the predicted three-dimensional mesh 502 with a coordinate system aligned to a coordinate system of a first image 500a in the plurality of images 500a-500n.

In one or more embodiments, the coordinate alignment system 102 can identify camera parameters 504a-504n associated with the images 500a-500n. For example, the first image 500a can be associated with a first set of camera parameters 504a. Similarly, a second image 500b can be associated with a second set of camera parameters 504b, etc. As previously mentioned, the coordinate alignment system 102 can determine the camera parameters associated with each image by obtaining the camera parameters from image capture device(s) used to capture the images. Alternatively, the coordinate alignment system 102 can determine the camera parameters from metadata of the images, from a third-party system, or by processing a corresponding image to estimate the camera parameters.

In one or more embodiments, the coordinate alignment system 102 passes the images 500a-500n to an encoder 506 to generate a feature vector for each of the images 500a-500n. Because each of the images can have different camera parameters (i.e., camera parameters 504a-504n) resulting in different visual information displayed within the images 500a-500n, the encoder 506 can generate unique feature vectors $z_1, z_2, \ldots, z_n$ for the images 500a-500n. Thus, a first feature vector $z_1$ for the first image 500a can be different than a second feature vector $z_2$ for the second image 500b, etc. The encoder 506 can thus incorporate the different views of an object within the images 500a-500n within each of the corresponding feature vectors.

Furthermore, as previously mentioned, the coordinate alignment system 102 can select a coordinate system associated with a particular image for aligning with a coordinate system of an output mesh of the object. To illustrate, the coordinate alignment system 102 can select a coordinate system associated with a first image 500a in the images 500a-500n. The first image 500a may be the first image chronologically in a sequence of images (e.g., the first video frame in a video) or another image in a sequence of images. Indeed, the coordinate alignment system 102 may select the first image and corresponding coordinate system from any of the images 500a-500n, such as by random selection or based on image quality.

Based on the selected coordinate system, the coordinate alignment system 102 can determine a subset of images that are not associated with the selected coordinate system. Specifically, the coordinate alignment system 102 can determine that the other images in the sequence (e.g., images 500b-500n and excluding the first image 500a) have coordinate systems that differ from the selected coordinate system based on having different views of the object. To illustrate, the coordinate alignment system 102 can use the camera parameters 504a-504n to determine the subset of images not associated with the selected coordinate system.

In response to identifying the subset of images not associated with the selected coordinate system, the coordinate alignment system 102 can generate new feature vectors for the subset of images. As FIG. 5 illustrates, the coordinate alignment system 102 can utilize a coordinate transform neural network 508 to generate coordinate-aligned feature vectors $z_2', \ldots, z_n'$ for the subset of images. In particular, the coordinate transform neural network 508 can process the original feature vectors $z_2, \ldots, z_n$ and the corresponding camera parameters 504b-504n to generate the coordinate-aligned feature vectors. For example, the coordinate transform neural network 508 can process a feature vector $z_2$ and camera parameters 504b corresponding to the second image 500b to transform the feature vector $z_2$ to a coordinate-aligned feature vector $z_2'$ that is aligned to the selected coordinate system and has the same fixed length as the original feature vector $z_2$. The coordinate alignment system 102 can thus generate new feature vectors for each of the images that are not aligned with the selected coordinate system. Additionally, the coordinate system 102 can leave the feature vector $z_1$ of the first image 500a as is due to the feature vector $z_1$ already being aligned to the coordinate system.

In one or more embodiments, the coordinate alignment system 102 can combine feature vectors aligned to the selected coordinate system. For instance, as illustrated in FIG. 5, the coordinate alignment system 102 can utilize a pooling layer 510 to combine a plurality of feature vectors and generate a new, combined feature vector. FIG. 5 further illustrates that the coordinate alignment system 102 generates a combined feature vector Z by combining the first feature vector $z_1$ of the first image 500a with coordinate-aligned feature vectors $z_2, \ldots, z_n$. In one or more embodiments, the pooling layer 510 includes an average pooling layer that combines feature vectors using average pooling on feature map representations of the images 500a-500n. Alternatively, the pooling layer 510 can utilize other pooling operations such as spatial pooling, max pooling, or min pooling.

In addition to generating a single, combined feature vector to represent the sequence of images 500a-500n, the coordinate alignment system 102 can also identify surface mapping coordinates in a surface mapping space 512 (e.g., "UV space"). In particular, as previously mentioned, the coordinate alignment system 102 can classify one or more objects within a sequence of images. For example, the coordinate alignment system 102 can utilize the encoder 506 to classify the object(s) when encoding the images 500a-500n into feature vectors. Alternatively, the coordinate alignment system 102 can utilize another system or component to perform image recognition processes that classify the object(s).

Once the coordinate alignment system 102 has determined a classification for an object in the images 500a-500n, the coordinate alignment system 102 can identify a base shape associated with the classification. Specifically, each classification can correspond to a specific geometric shape such as a sphere, a set of two-dimensional planes, or another object (e.g., an animal or a human). Additionally, determining the base shape also allows the coordinate alignment system 102 to determine a set of surface mapping coordinates associated with the base shape. To illustrate, in response to determining that an object in the images 500a-500n corresponds to a spherical base shape, the coordinate alignment system 102 can determine surface mapping coordinates to map points on the surface of the sphere in three-dimensional space to two-dimensional coordinates in the surface mapping space 512.

The coordinate alignment system 102 can then pass the combined feature vector Z and the surface mapping coordinates in the surface mapping space 512 to a surface generation neural network 514. Specifically, the surface generation neural network 514 can decode the combined feature vector Z to modify a mapping between the surface mapping coordinates and corresponding three-dimensional points of the base shape to generate the predicted three-dimensional mesh 502. For example, the coordinate alignment system 102 can use the decoded combined feature vector Z to determine new positions of three-dimensional coordinates by sampling points in the surface mapping coordinates within one or more surfaces/patches of the surface mapping space 512. The coordinate alignment system 102 can then concatenate the sampled point with the average pulled feature that is passed to the surface generation neural network 514, which then generates a three-dimensional point. The surface generation neural network 514 can thus effectively "wrap" one or more surfaces/patches from the surface mapping space 512 to fit the predicted three-dimensional mesh 502 using the combined feature vector Z.

Additionally, in one or more embodiments, the coordinate alignment system 102 can utilize the predicted three-dimensional mesh 502 in a mesh-generation process with additional operations. For example, the coordinate alignment system 102 can provide the predicted three-dimensional mesh 502 to a component or system that performs multi-view cycle projection across a plurality of images. To illustrate, the three-dimensional scene reconstruction system 110 of FIG. 1 can include a multi-view cycle projection system for performing an iterative mesh generation process that uses predicted meshes to determine a multi-view cycle consistency and then generate an improved predicted mesh (e.g., by generating improved feature vectors for the images). For example, the three-dimensional scene reconstruction system 110 can utilize the multi-view cycle projection process described in RECONSTRUCTING THREE-DIMENSIONAL SCENES USING MULTI-VIEW CYCLE PROJECTION, U.S. patent application Ser. No. 16/816,080, which is incorporated by reference herein. The improved predicted mesh can also be aligned to the selected coordinate system.

As described in relation to FIGS. 2-5, the coordinate alignment system 102 can perform operations for aligning a coordinate system of a generated three-dimensional mesh to a coordinate system of an image in a sequence of images. The operations allow the coordinate alignment system 102 to accurately and efficiently reconstruct an object in a three-dimensional space using two-dimensional images. Accordingly, the acts and operations illustrated and described above in relation to FIGS. 3 and 5 can provide the corresponding acts or algorithms (e.g., structure) for a step for generating a three-dimensional mesh representing the object within the first coordinate system using a combined latent vector based on the first image and the second image.

Figure 6:
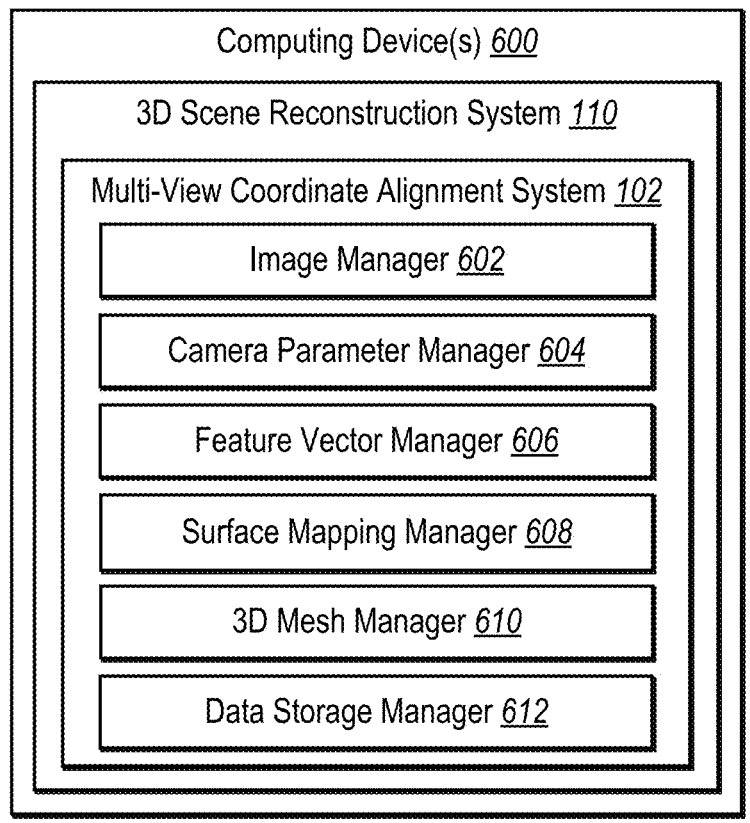
FIG. 6 illustrates a diagram of the multi-view coordinate alignment system of FIG. 1 in accordance with one or more implementations.

FIG. 6 illustrates a detailed schematic diagram of an embodiment of the multi-view coordinate alignment system 102 described above. As shown, the coordinate alignment system 102 can be implemented in a 3D scene reconstruction system 110 on computing device(s) 600 (e.g., a client device and/or server device as described in FIG. 1, and as further described below in relation to FIG. 8). Additionally, the coordinate alignment system 102 can include, but is not limited to, an image manager 602, a camera parameter manager 604, a feature vector manager 606, a surface mapping manager 608, a 3D mesh manager 610, and a data storage manager 612. The coordinate alignment system 102 can be implemented on any number of computing devices. For example, the coordinate alignment system 102 can be implemented in a distributed system of server devices for processing digital images and rendering three-dimensional objects. The coordinate alignment system 102 can also be implemented within one or more additional systems. Alternatively, the coordinate alignment system 102 can be implemented on a single computing device such as a single client device.

In one or more embodiments, each of the components of the coordinate alignment system 102 is in communication with other components using any suitable communication technologies. Additionally, the components of the coordinate alignment system 102 can be in communication with one or more other devices including other computing devices of a user, server devices (e.g., cloud storage devices), licensing servers, or other devices/systems. It will be recognized that although the components of the coordinate alignment system 102 are shown to be separate in FIG. 6, any of the subcomponents may be combined into fewer components, such as into a single component, or divided into more components as may serve a particular implementation. Furthermore, although the components of FIG. 6 are described in connection with the coordinate alignment system 102, at least some of the components for performing operations in conjunction with the coordinate alignment system 102 described herein may be implemented on other devices within the environment.

The components of the coordinate alignment system 102 can include software, hardware, or both. For example, the components of the coordinate alignment system 102 can include one or more instructions stored on a computer-readable storage medium and executable by processors of one or more computing devices (e.g., the computing device(s) 600). When executed by the one or more processors, the computer-executable instructions of the coordinate alignment system 102 can cause the computing device(s) 600 to perform the image processing operations described herein. Alternatively, the components of the coordinate alignment system 102 can include hardware, such as a special purpose processing device to perform a certain function or group of functions. Additionally, or alternatively, the components of the coordinate alignment system 102 can include a combination of computer-executable instructions and hardware.

Furthermore, the components of the coordinate alignment system 102 performing the functions described herein with respect to the coordinate alignment system 102 may, for example, be implemented as part of a stand-alone application, as a module of an application, as a plug-in for applications, as a library function or functions that may be called by other applications, and/or as a cloud-computing model. Thus, the components of the coordinate alignment system 102 may be implemented as part of a stand-alone application on a personal computing device or a mobile device. Alternatively, or additionally, the components of the coordinate alignment system 102 may be implemented in any application that provides three-dimensional image rendering, including, but not limited to ADOBE® DIMENSION®, and ADOBE® CREATIVE CLOUD® software. "ADOBE," "ADOBE DIMENSION," and "CREATIVE CLOUD" are registered trademarks of Adobe in the United States and/or other countries.

As described above, the coordinate alignment system 102 can include an image manager 602 to facilitate management of digital images for a three-dimensional mesh generation process. For example, the image manager 602 can obtain and store a plurality of digital images of an object. The image manager 602 can also store information about the images including camera pose information or sequence information. The image manager 602 can also obtain information associated with the images such as labels or object classifications. The image manager 602 can also manage training data including images that the coordinate alignment system 102 uses to learn parameters of one or more neural networks.

The coordinate alignment system 102 can also include a camera parameter manager 604 to facilitate management of camera parameters associated with images. For example, the camera parameter manager 604 can communicate with an image capture device to obtain camera parameters for images. Alternatively, the camera parameter manager 604 can determine camera parameters by communicating with one or more other components (e.g., the image manager 602) to process the images for determining the camera parameters. The camera parameter manager 604 can also determine coordinate systems for the images based on the camera parameters.

Additionally, the coordinate alignment system 102 can include a feature vector manager 606 to facilitate management of feature vectors associated with images. For example, the feature vector manager 606 can utilize a neural network encoder to generate feature vectors representing images and/or objects within the images. The feature vector manager 606 can communicate with the image manager 602 and/or the data storage manager 612 to store the feature vectors for the respective images. The feature vector manager 606 can further utilize a coordinate transform neural network to generate coordinate-aligned feature vectors for one or more images based on selected coordinate systems. The feature vector manager 606 can also generate combined feature vectors (e.g., using a pooling layer) representing a sequence of images (or an object in the sequence of images).

Furthermore, the coordinate alignment system 102 can include a surface mapping manager 608 to facilitate the determination and management of surface mapping coordinates in a surface mapping space. Specifically, the surface mapping manager 608 can determine (or otherwise identify) a base shape (e.g., a template) corresponding to an object in a sequence of images. The surface mapping manager 608 can then determine surface mapping coordinates mapping two-dimensional points in a two-dimensional space to three-dimensional points on a surface of the base shape in three-dimensional space.

The coordinate alignment system 102 can further include a 3D mesh manager 610 to facilitate the generation and management of three-dimensional meshes of objects detected in images. For example, the 3D mesh manager 610 can communicate with the feature vector manager 606 and the surface mapping manager 608 to obtain a combined feature vector and surface mapping coordinates, respectively. The 3D mesh manager 610 can also utilize a surface generation neural network to generate a predicted three-dimensional mesh representing an object based on the combined feature vector and the surface mapping coordinates.

Additionally, the coordinate alignment system 102 also includes a data storage manager 610 (that comprises a non-transitory computer memory/one or more memory devices) that stores and maintains data associated with reconstructing three-dimensional objects from two-dimensional digital images. For example, the data storage manager 610 can store information associated with images, camera parameters, mappings between coordinate spaces, three-dimensional meshes, feature vectors, and coordinate systems. The data storage manager 610 can also store information associated with a neural network encoder, a coordinate transform neural network, and/or a surface generation neural network.

Figure 7:
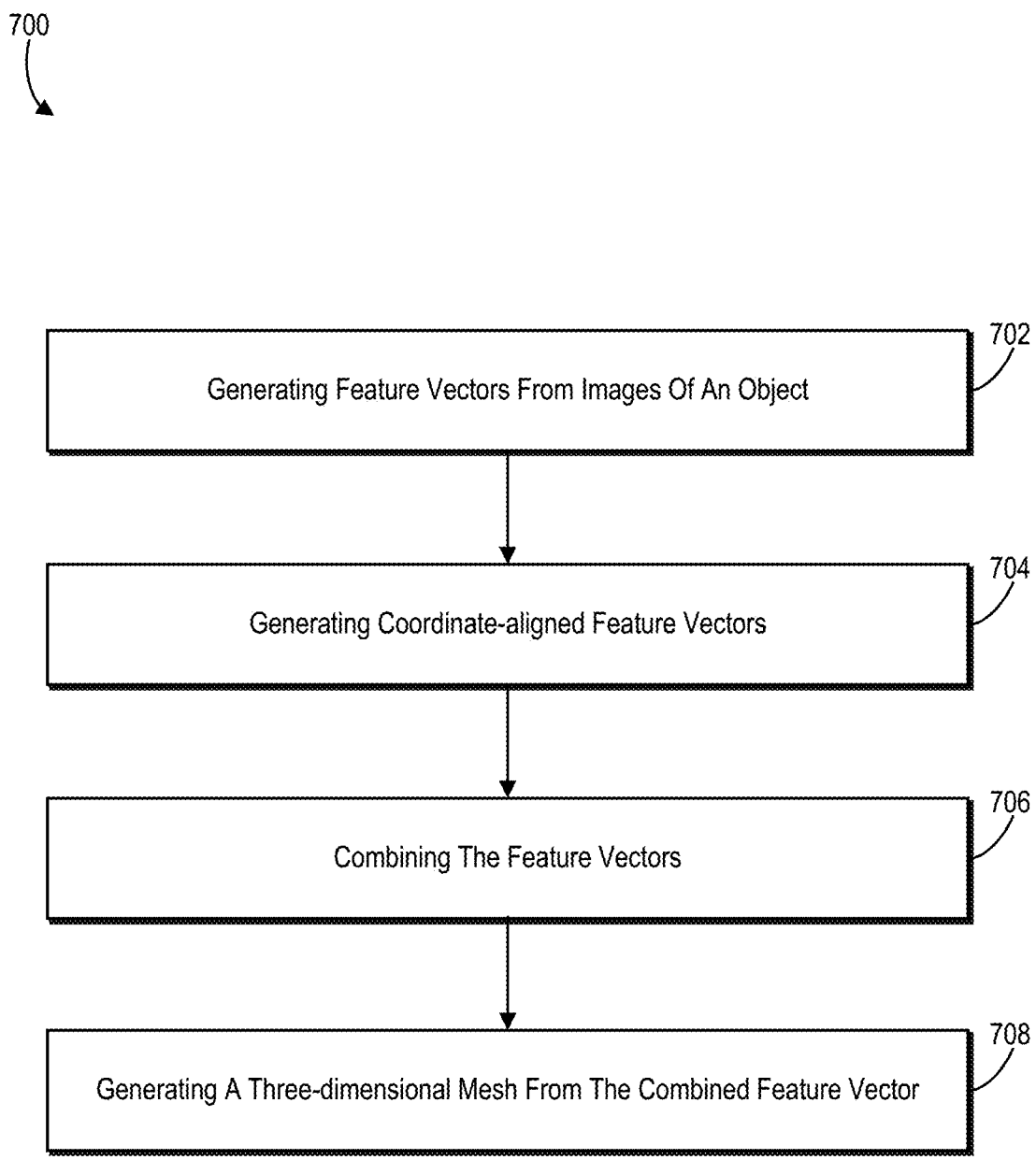
FIG. 7 illustrates a flowchart of a series of acts for using multi-view coordinate alignment to generate a three-dimensional mesh in accordance with one or more implementations.

Turning now to FIG. 7, this figure shows a flowchart of a series of acts 700 of using multi-view coordinate alignment to generate a three-dimensional mesh. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7.

As shown, the series of acts 700 includes an act 702 of generating feature vectors from images of an object. For example, act 702 involves generating a first feature vector from a first image comprising a first view of an object and a second feature vector from a second image comprising a second view of the object. Act 702 can involve generating the first feature vector and the second feature vector by utilizing a neural network encoder to generate the first feature vector from the first image and the second feature vector from the second image. For example, act 702 can involve generating, for the first image, the first feature vector representing visual information in the first image and generating, for the second image, the second feature vector representing visual information in the second image, wherein the first feature vector and the second feature vector have a fixed length. In one or more embodiments, the first image corresponds to a first coordinate system, and the second image corresponds to a second coordinate system that is different from the first coordinate system. Additionally, act 702 can involve utilizing the neural network encoder to generate a third feature vector from a third image comprising a third view of the object.

The series of acts 700 also includes an act 704 of generating coordinate-aligned feature vectors. For example, act 704 involves processing the second feature vector and camera parameters associated with the second image to generate a coordinate-aligned feature vector for the second image. Act 704 can involve generating the coordinate-aligned feature vector for the second image by utilizing a coordinate transform neural network to process the second feature vector and the camera parameters associated with the second image.

Act 704 can involve selecting a coordinate system of the first image. Act 704 can involve determining a subset of images that are not aligned to the coordinate system of the first image, wherein the subset of images comprises at least the second image. Act 704 can then involve processing feature vectors and camera parameters of images in the subset of images to generate coordinate-aligned feature vectors for the images in the subset of images. For example, act 704 can involve processing the third feature vector and camera parameters associated with the third image utilizing the coordinate transform neural network to generate an additional coordinate-aligned feature vector for the third image.

Additionally, the series of acts 700 includes an act 706 of combining the feature vectors. For example, act 706 involves combining the coordinate-aligned feature vector for the second image and the first feature vector for the first image to generate a combined feature vector representing the object. Act 706 can involve combining the coordinate-aligned feature vector for the second image and the first feature vector for the first image using a pooling layer that pools a plurality of feature vectors. Additionally, act 706 can involve combining the first feature vector, the coordinate-aligned feature vector for the second image, and the additional coordinate-aligned feature vector for the third image to generate the combined feature vector representing the object. For example, the pooling layer can include an average pooling layer to determine an average pooling of the first feature vector and the coordinate-aligned feature vector to generate the combined latent vector representing the object.

Furthermore, the series of acts 700 includes an act 708 of generating a three-dimensional mesh from the combined feature vector. For example, act 708 involves generating a three-dimensional mesh representing the object from the combined feature vector representing the object. Act 708 can involve generating the three-dimensional mesh by using a surface generation neural network to generate the three-dimensional mesh from the combined feature vector. Additionally, act 708 can involve providing the three-dimensional mesh for display via a client device. Act 708 can also involve providing the three-dimensional mesh for display relative to the first coordinate system associated with the first image.

As part of act 708, or as an additional act, the series of acts 700 can include identifying surface mapping coordinates comprising two-dimensional coordinates that map to a three-dimensional surface. For instance, the series of acts 700 can include determining a geometry classification for the object from the first image and the second image. The series of acts 700 can then include identifying the surface mapping coordinates based on the geometry classification for the object. Act 708 can then involve generating the three-dimensional mesh representing the object from the combined feature vector representing the object and the surface mapping coordinates using the surface generation neural network. For example, act 708 can involve modifying, utilizing the surface generation neural network, the surface mapping coordinates to change a base shape of the geometry classification to a target shape corresponding to the object using the combined feature vector.

In one or more embodiments, the series of acts 700 can include generating, for a sequence of images of a ground truth object and ground truth camera parameters, an output mesh representing the ground truth object using the neural network encoder, the coordinate transform neural network, and the surface generation neural network. The series of acts 700 can include determining a chamfer loss based on three-dimensional coordinates in the output mesh. For instance, the series of acts 700 can include calculating, for each three-dimensional coordinate in the output mesh, a Euclidean distance to a nearest mesh coordinate in a ground truth mesh for the ground-truth object, and then summing the Euclidean distance across the three-dimensional coordinates in the output mesh to determine the chamfer loss. The series of acts 700 can then include learning parameters of the neural network encoder, the coordinate transform neural network, and the surface generation neural network using the chamfer loss.

In one or more embodiments, the series of acts 700 can include generating a third feature vector from a third image of a ground truth object and a fourth feature vector from a fourth image of the ground truth object. The series of acts 700 can include processing the fourth feature vector associated with the fourth image to generate a coordinate-aligned feature vector for the fourth image, and then combining the coordinate-aligned feature vector for the fourth image and the third feature vector from the third image to generate a combined feature vector representing the ground truth object. The series of acts 700 can also include generating a predicted three-dimensional mesh representing the ground truth object from the combined feature vector representing the ground truth object.

Furthermore, the series of acts 700 can include comparing the predicted three-dimensional mesh to a ground truth mesh for the ground truth object. The series of acts 700 can then include learning parameters of the neural network encoder, the coordinate transform neural network, and the surface generation neural network based on a difference between the predicted three-dimensional mesh and the ground truth mesh.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
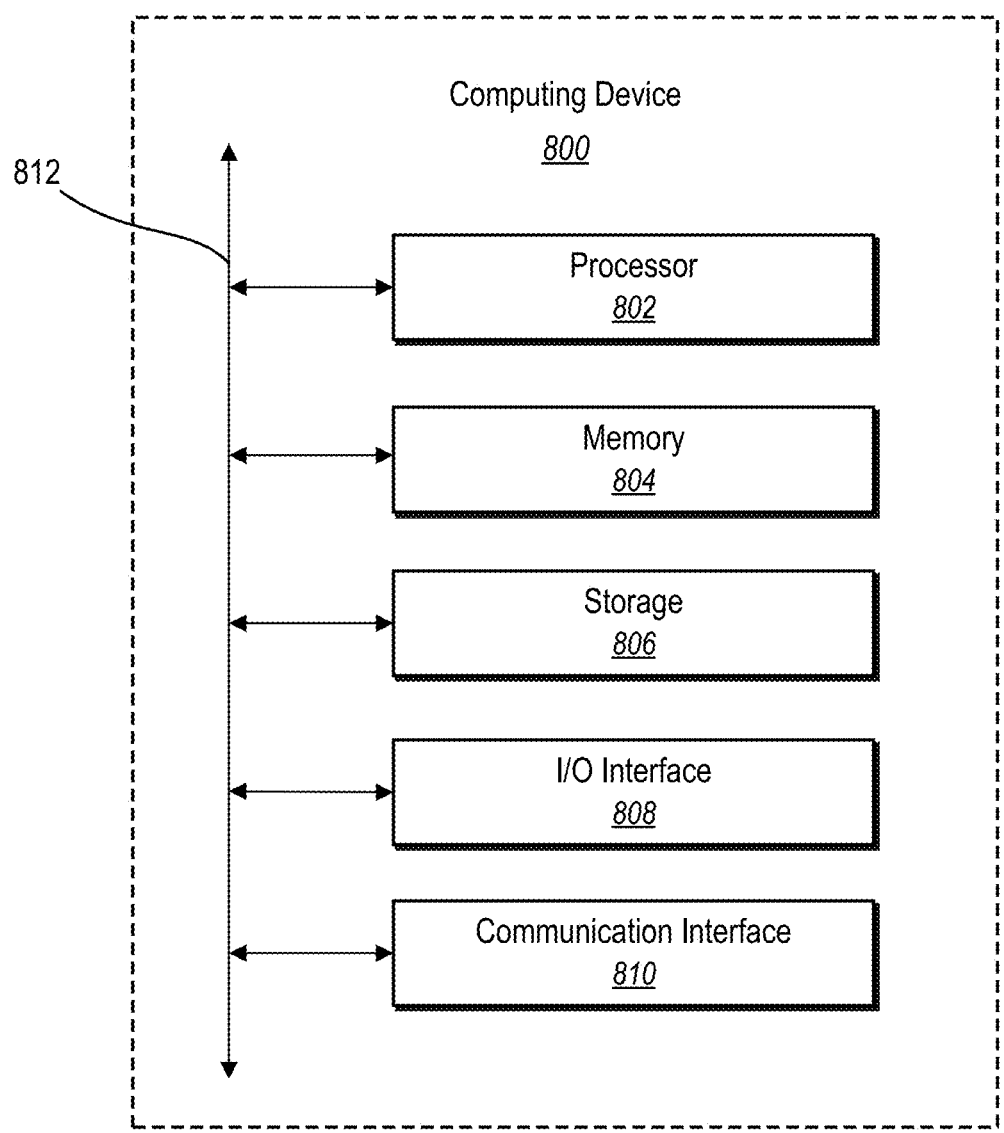
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the system(s) of FIG. 1. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions for dynamically modifying workflows, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions for performing the methods described herein.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example, and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
    generate, utilizing a neural network encoder, a first feature vector by encoding visual features from a first image comprising a first view of an object and a second feature vector by encoding visual features from a second image comprising a second view of the object;
    determine camera parameters associated with the second image based on a camera pose of a camera that captured the second image;
    generate a coordinate-aligned feature vector for the second image from the second feature vector by utilizing a coordinate transform neural network to process the second feature vector based on the camera parameters associated with the second image;
    combine the coordinate-aligned feature vector for the second image and the first feature vector for the first image to generate a combined feature vector representing the object; and
    generate a three-dimensional mesh representing the object from the combined feature vector representing the object.

2. The non-transitory computer readable storage medium as recited in claim 1, wherein the instructions that cause the computing device to:
    generate the three-dimensional mesh by using a surface generation neural network to generate the three-dimensional mesh from the combined feature vector.

3. The non-transitory computer readable storage medium as recited in claim 2, further comprising instructions that, when executed by the at least one processor, cause the computing device to:
    utilize the neural network encoder to generate a third feature vector from a third image comprising a third view of the object;
    generate an additional coordinate-aligned feature vector for the third image by processing the third feature vector based on camera parameters associated with the third image utilizing the coordinate transform neural network; and
    combine the first feature vector, the coordinate-aligned feature vector for the second image, and the additional coordinate-aligned feature vector for the third image to generate the combined feature vector representing the object.

4. The non-transitory computer readable storage medium as recited in claim 3, wherein the instructions that cause the computing device to combine the coordinate-aligned feature vector further cause the computing device to use an average pooling layer to determine an average pooling of the first feature vector and the coordinate-aligned feature vector to generate the combined feature vector representing the object.

5. The non-transitory computer readable storage medium as recited in claim 2, further comprising instructions that, when executed by the at least one processor, cause the computing device to:
    identify surface mapping coordinates comprising two-dimensional coordinates that map to a three-dimensional surface; and
    generate the three-dimensional mesh representing the object from the combined feature vector representing the object and the surface mapping coordinates using the surface generation neural network.

6. The non-transitory computer readable storage medium as recited in claim 5, wherein the instructions that cause the computing device to identify the surface mapping coordinates further cause the computing device to:
    determine a geometry classification for the object from the first image and the second image; and
    identify the surface mapping coordinates based on the geometry classification for the object.

7. The non-transitory computer readable storage medium as recited in claim 6, wherein the instructions that cause the computing device to generate the three-dimensional mesh further cause the computing device to modify, utilizing the surface generation neural network, the surface mapping coordinates to change a base shape of the geometry classification to a target shape corresponding to the object using the combined feature vector.

8. The non-transitory computer readable storage medium as recited in claim 2, further comprising instructions that, when executed by the at least one processor, cause the computing device to:
    generate, for a sequence of images of a ground truth object and ground truth camera parameters, an output mesh representing the ground truth object using the neural network encoder, the coordinate transform neural network, and the surface generation neural network;

determine a chamfer loss based on three-dimensional coordinates in the output mesh; and learn parameters of the neural network encoder, the coordinate transform neural network, and the surface generation neural network using the chamfer loss.

9. The non-transitory computer readable storage medium as recited in claim 8, wherein the instructions that cause the computing device to determine the chamfer loss further cause the computing device to:

calculate, for each three-dimensional coordinate in the output mesh, a Euclidean distance to a nearest mesh coordinate in a ground truth mesh for the ground truth object; and sum the Euclidean distance across the three-dimensional coordinates in the output mesh to determine the chamfer loss.

10. A system comprising:

at least one computer memory device comprising a first image comprising a first view of an object and a second image comprising a second view of the object, wherein the first image corresponds to a first coordinate system and the second image corresponds to a second coordinate system; and one or more servers configured to cause the system to:

utilize a neural network encoder to generate a first feature vector by encoding visual features from the first image and a second feature vector by encoding visual features from the second image;

determine camera parameters associated with the second image based on a camera pose of a camera that captured the second image;

generate a coordinate-aligned feature vector for the second image from the second feature vector by utilizing a coordinate transform neural network to process the second feature vector based on the camera parameters associated with the second image;

combine, using a pooling layer that pools a plurality of feature vectors, the coordinate-aligned feature vector for the second image and the first feature vector for the first image to generate a combined feature vector representing the object;

identify surface mapping coordinates comprising two-dimensional coordinates that map to a three-dimensional surface; and generate a three-dimensional mesh representing the object within the first coordinate system by processing the combined feature vector representing the object and the surface mapping coordinates using a surface generation neural network.

11. The system as recited in claim 10, wherein the one or more servers are further configured to:

utilize the neural network encoder to generate a third feature vector by encoding visual features from a third image comprising a third view of the object; and generate an additional coordinate-aligned feature vector for the third image from the third feature vector by utilizing the coordinate transform neural network to process the third feature vector based on camera parameters associated with the third image utilizing the coordinate transform neural network.

12. The system as recited in claim 11, wherein the one or more servers are further configured to combine, using the pooling layer, the first feature vector, the coordinate-aligned feature vector for the second image, and the additional coordinate-aligned feature vector for the third image to generate the combined feature vector representing the object.

13. The system as recited in claim 10, wherein the one or more servers are further configured to identify the surface mapping coordinates by:

determining a base shape of a geometry classification for the object from the first image and the second image;

identifying the surface mapping coordinates based on the base shape; and generating the three-dimensional mesh by modifying the surface mapping coordinates to change the base shape to a target shape corresponding to the object using the combined feature vector.

14. The system as recited in claim 10, wherein the one or more servers are further configured to learn parameters of the neural network encoder, the coordinate transform neural network, and the surface generation neural network by:

generating a third feature vector from a third image of a ground truth object and a fourth feature vector from a fourth image of the ground truth object;

generating a coordinate-aligned feature vector for the fourth image from the fourth feature vector associated with the fourth image;

combining the coordinate-aligned feature vector for the fourth image and the third feature vector from the third image to generate a combined feature vector representing the ground truth object; and generating a predicted three-dimensional mesh representing the ground truth object from the combined feature vector representing the ground truth object.

15. The system as recited in claim 14, wherein the one or more servers are further configured to learn parameters of the neural network encoder, the coordinate transform neural network, and the surface generation neural network by:

comparing the predicted three-dimensional mesh to a ground truth mesh for the ground truth object; and learning parameters of the neural network encoder, the coordinate transform neural network, and the surface generation neural network based on a difference between the predicted three-dimensional mesh and the ground truth mesh.

16. The system as recited in claim 10, wherein combining the coordinate-aligned feature vector and the first feature vector comprises determining an average pooling of the coordinate-aligned feature vector and the first feature vector using the pooling layer.

17. The system as recited in claim 10, wherein the coordinate transform neural network comprises a multilayer perceptron neural network that analyzes feature vectors associated with initial coordinate systems to generate feature vectors associated with modified coordinate systems.

18. A computer-implemented method comprising:

identifying a first image comprising a first view of an object and a second image comprising a second view of the object, wherein the first image corresponds to a first coordinate system;

generating, utilizing a neural network encoder, a first feature vector by encoding visual features from the first image comprising the first view of the object and a second feature vector by encoding visual features from the second image comprising the second view of the object;

determining camera parameters associated with the second image based on a camera pose of a camera that captured the second image;

generating a coordinate-aligned feature vector for the second image from the second feature vector by utilizing a coordinate transform neural network to process the second feature vector based on the camera parameters associated with the second image;

combining the coordinate-aligned feature vector for the second image and the first feature vector for the first image to generate a combined feature vector representing the object;

generating a three-dimensional mesh representing the object from the combined feature vector representing the object; and providing the three-dimensional mesh for display via a client device.

19. The computer-implemented method as recited in claim 18, wherein the second image corresponds to a second coordinate system based on the camera pose of the camera that captured the second image that is different from the first coordinate system corresponding to the first image.

20. The computer-implemented method as recited in claim 19, wherein providing the three-dimensional mesh for display via the client device comprises providing the three-dimensional mesh for display relative to the first coordinate system.

* * * * *